US007321905B2

(12) United States Patent
Hartline et al.

(10) Patent No.: US 7,321,905 B2
(45) Date of Patent: Jan. 22, 2008

(54) SYSTEM AND METHOD FOR EFFICIENT DATA RECOVERY IN A STORAGE ARRAY UTILIZING MULTIPLE PARITY SLOPES

(75) Inventors: Jeffrey R. Hartline, Ithaca, NY (US); Tapas Kanungo, San Jose, CA (US); James Lee Hafner, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 10/956,468

(22) Filed: Sep. 30, 2004

(65) Prior Publication Data

US 2006/0074954 A1 Apr. 6, 2006

(51) Int. Cl.
*G06F 17/00* (2006.01)
(52) U.S. Cl. .................. 707/202; 711/114; 714/800
(58) Field of Classification Search ............... None
See application file for complete search history.

(56) References Cited

U.S. PATENT DOCUMENTS

| | | | | |
|---|---|---|---|---|
| 5,208,813 | A | * | 5/1993 | Stallmo ........................ 714/7 |
| 5,235,601 | A | * | 8/1993 | Stallmo et al. ............. 714/766 |
| 5,390,187 | A | * | 2/1995 | Stallmo ........................ 714/7 |
| 5,485,571 | A | | 1/1996 | Menon ...................... 395/182 |
| 5,519,844 | A | * | 5/1996 | Stallmo ..................... 711/114 |
| 5,522,032 | A | | 5/1996 | Franaszek et al. ......... 395/182 |
| 5,537,567 | A | * | 7/1996 | Galbraith et al. .......... 711/114 |
| 5,550,849 | A | * | 8/1996 | Harrington ................. 714/752 |
| 5,613,059 | A | * | 3/1997 | Stallmo et al. ............... 714/6 |
| 5,617,530 | A | * | 4/1997 | Stallmo et al. ............... 714/6 |
| 5,708,769 | A | * | 1/1998 | Stallmo ......................... 714/6 |
| 5,737,744 | A | * | 4/1998 | Callison et al. ............ 711/114 |

(Continued)

FOREIGN PATENT DOCUMENTS

EP 1324200 7/2003

(Continued)

OTHER PUBLICATIONS

"Efficient Addressing Scheme for Clustered Redundant Array of Independent Disks," IBM Technical Disclosure Bulletin, vol. 36 No. 06B, Jun. 1993.

(Continued)

*Primary Examiner*—Sana Al-Hashemi
*Assistant Examiner*—Hubert Cheung
(74) *Attorney, Agent, or Firm*—Samuel A. Kassatly; Fleit Kain Gibbons Gutman Bongini & Bianco, P.L.

(57) ABSTRACT

A recovery enabling system for storage arrays is a high distance generalization of RAID-5 with optimal update complexity and near optimal storage efficiency. The recovery enabling system utilizes presets, data cells with known values that initialize the reconstruction process. The presets allow resolution of parity equations to reconstruct data when failures occur. In one embodiment, additional copies of the layout of the recovery enabling system are packed onto the same disks to minimize the effect of presets on storage efficiency without destroying the clean geometric construction of the recovery enabling system. The recovery enabling system has efficient XOR-based encoding, recovery, and updating algorithms for arbitrarily large distances, making the recovery enabling system an ideal candidate when storage-efficient reliable codes are required.

20 Claims, 12 Drawing Sheets

U.S. PATENT DOCUMENTS

| | | | |
|---|---|---|---|
| 5,761,402 A | 6/1998 | Kaneda et al. | 395/182 |
| 5,862,158 A | 1/1999 | Baylor et al. | 371/49 |
| 5,911,779 A * | 6/1999 | Stallmo et al. | 714/6 |
| 6,282,671 B1 | 8/2001 | Islam et al. | 714/6 |
| 6,298,415 B1 | 10/2001 | Riedle | 711/114 |
| 6,353,895 B1 | 3/2002 | Stephenson | 714/5 |
| 6,871,317 B1 * | 3/2005 | Corbett | 714/800 |
| 7,080,278 B1 * | 7/2006 | Kleiman et al. | 714/6 |
| 7,162,684 B2 * | 1/2007 | Hocevar | 714/800 |
| 2002/0194530 A1 | 12/2002 | Santeler et al. | 714/6 |
| 2003/0126523 A1 * | 7/2003 | Corbett et al. | 714/718 |
| 2004/0148560 A1 * | 7/2004 | Hocevar | 714/801 |
| 2005/0160307 A1 * | 7/2005 | Schmisseur | 714/5 |

FOREIGN PATENT DOCUMENTS

| | | |
|---|---|---|
| WO | WO0229539 A2 | 4/2002 |

OTHER PUBLICATIONS

Martha L. Escobar et al., "Improved Data Layouts For Fault-Tolerant Multimedia Systems," available at http://www.asgard.com/~mescobar/papers/fault.pdf, on Sep. 25, 2004.

Tom Fuja et al., "Cross Parity Check Convolutional Codes," IEEE Transactions on Information Theory, vol. 35, No. 6, Nov. 1989.

* cited by examiner

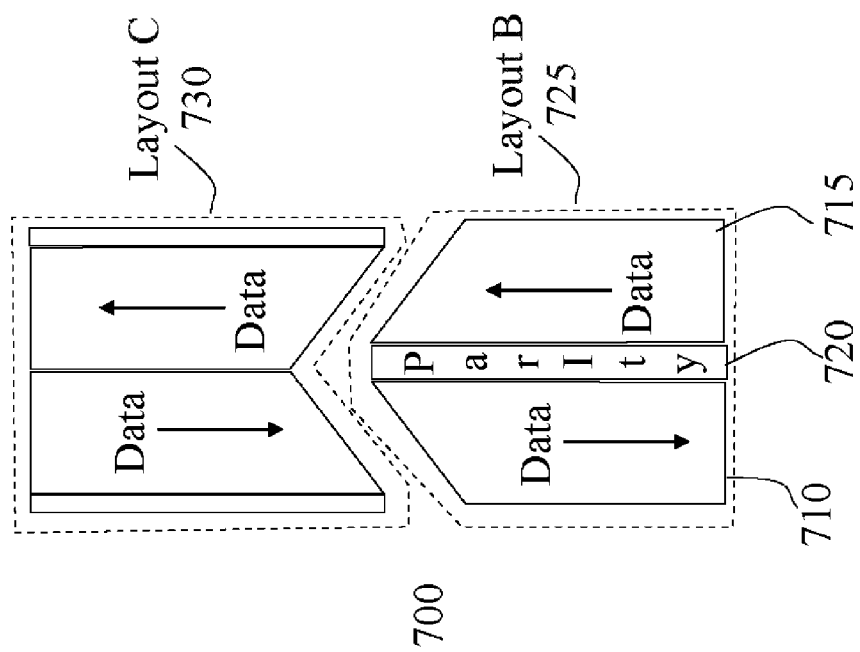
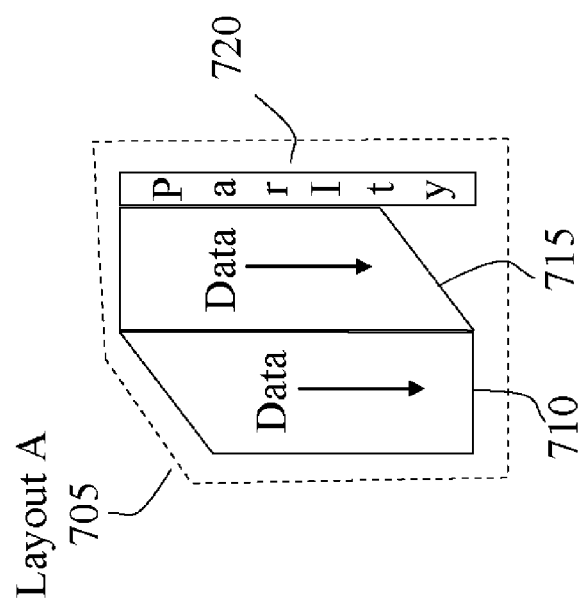

SYSTEM AND METHOD FOR EFFICIENT DATA RECOVERY IN A STORAGE ARRAY UTILIZING MULTIPLE PARITY SLOPES

FIELD OF THE INVENTION

The present invention relates to the field of data storage, and particularly to disk array systems. More specifically, this invention pertains to a method for enabling reconstruction of any one or combination of failed storage devices in a disk array system.

BACKGROUND OF THE INVENTION

Computer systems utilize data redundancy schemes such as parity computation to protect against loss of data on a storage device. A redundancy value is computed by calculating a function of the data of a specific word size across a quantity of similar storage devices, also referenced as data drives. One example of such redundancy is exclusive OR (XOR) parity that is computed as the binary sum of the data; another common redundancy uses Reed-Solomon codes based on finite field arithmetic.

The redundancy values, hereinafter referenced as parity values, are stored on a plurality of storage devices, also referenced as parity drives. In the case of a parity drive failure, or loss of data on the parity drive, the data on the parity drive can be regenerated from data stored on the data drives. Similarly, in the case of data drive failure, or loss of data on the data drive, the data on the data drive can be regenerated from the data stored on the parity drives and other non-failing data drives. Data is regenerated from the parity drives by adding the data on the remaining data drives and subtracting the result from data stored on the parity drives.

In Redundant Arrays of Independent Disk (RAID) systems, data files and related parity are striped across disk drives. In storage subsystems that manage hard disk drives as a single logical direct or network access storage device (DASD/NASD), the RAID logic is implemented in an array controller of the subsystem. Such RAID logic may also be implemented in a host system in software.

Disk arrays, in particular RAID-3 and RAID-5 disk arrays, have become accepted designs for highly available and reliable disk subsystems. In such arrays, the XOR of data from some number of disks is maintained on a redundant disk (the parity drive). When a disk fails, the data on it can be reconstructed by exclusive-ORing the data on the surviving disks and writing this data into a spare disk. Data is lost if a second disk fails before the reconstruction is complete.

Typical storage system models emphasize three principle metrics: reliability, storage efficiency, and performance. The reliability of an array code is a function of its column distance. A code of column distance d can recover from the erasure of d−1 entire columns without data loss. The storage efficiency of a code is the number of independent data symbols divided by the total number of symbols used by the code. The performance of an array code is measured with respect to the update complexity (UC) of the array code; i.e., the number of parity symbols affected by a change in a data symbol. Update complexity affects the number of IOs required to modify a data symbol, which in turn affects the average throughput of the storage system. Both the average and maximum update complexity over all the data symbols are used as measures of a code's performance.

A variety of techniques have been implemented to reliably and efficiently recover from a failure in a disk array system. Although these techniques have proven to be useful, it would be desirable to present additional improvements. Reed-Solomon codes [reference is made to I. S. Reed, et. al., "Polynomial codes over certain finite fields," Journal of the Society for Industrial and Applied Mathematics, vol. 8, pp. 300-304, 1960] have been proposed for the storage model [reference is made J. Plank, "A tutorial on Reed-Solomon coding for fault-tolerance in RAID-like systems," Software: Practice and Experience, vol. 27, pp. 995-1012, 1997]. However, Reed-Solomon codes require finite field arithmetic and are therefore impractical without special purpose hardware.

Various other codes have been proposed for recovering from failures in storage systems such as, for example, Turbo codes [reference is made to D. J. C. MacKay, Information Theory, Inference, and Learning Algorithms, http://www.inference.phy.cam.ac.uk/mackay/itprnn/], Tornado codes [reference is made to M. G. Luby, et. al., "Efficient erasure correcting codes," IEEE Transactions on Information Theory, vol. 47, pp. 569-584, 2001], LT codes [reference is made to M. Luby, "LT codes," in Proceedings of the 43rd Annual IEEE Symposium on the Foundations of Computer Science, 2002, pp. 271-280], and Raptor codes [reference is made to A. Shokrollahi, "Raptor codes," 2003]. However, the probabilistic nature of these codes does not lend itself well to the storage model. Furthermore, the communication model of these codes puts stress on the computational cost of encoding and decoding as opposed to the cost of IO seeks, which dominate in storage systems.

Conventional RAID algorithms generally tend to be inefficient for all but the distance two case as used by, for example, RAID-5 [reference is made to J. H. Hennessy, et. al., Computer Architecture: A Quantitative Approach. San Francisco, Calif.: Morgan Kaufmann, 2003 and p. Massiglia, The RAID Book. St. Peter, Minn.: The RAID Advisory Board, Inc., 1997]. Array codes are perhaps the most applicable codes for the storage model where large amounts of data are stored across many disks and the loss of a data disk corresponds to the loss of an entire column of symbols [reference is made to M. Blaum, et. al., "Array codes," in Handbook of Coding Theory (Vol. 2), V. S. Pless and W. C. Huffman, Eds. North Holland, 1998, pp. 1855-1909]. Array codes are two-dimensional burst error-correcting codes that use XOR parity along lines at various angles.

While Low Density Parity Check (LPDC) codes [reference is made to R. G. Gallager, Low-Density Parity-Check Codes. Cambridge, Mass.: MIT Press, 1962 and M. G. Luby, et. al., "Efficient erasure correcting codes," IEEE Transactions on Information Theory, vol. 47, pp. 569-584, 2001] were originally invented for communication purposes, the concepts have been applied in the storage system framework. Convolution array codes [reference is made to M. Blaum, et al., "Array codes," in Handbook of Coding Theory (Vol. 2), V. S. Pless and W. C. Huffman, Eds. North Holland, 1998, pp. 1855-1909; and T. Fuja, et al., "Cross parity check convolution codes", IEEE Transactions on Information Theory, vol. 35, pp. 1264-1276, 1989] are a type of array code, but these codes assume semi-infinite length tapes of data and reconstruction progresses sequentially over these tapes, and in addition their parity elements are not independent. These codes are not directly applicable to the storage model where the efficient reconstruction of randomly located data is required. The present invention has some similarities to convolution array codes, but differ in two respects. The present invention converts the semi-infinite tape into logical short finite loops enabling efficient reconstruction of randomly located data. Furthermore, the present invention has independent parity, allowing for parity computations in parallel.

Maximum Distance Separable (MDS) codes, or codes with optimal storage efficiency, have been proposed. The Blaum-Roth (BR) code [reference is made to M. Blaum, et. al., "On lowest density MDS codes," IEEE Transactions on Information Theory, vol. 45, pp. 46-59, 1999], the EvenOdd (EO) code [reference is made to M. Blaum, et. al., "EVENODD: an efficient scheme for tolerating double disk failures in RAID architectures," IEEE Transactions on Computers, vol. 44, pp. 192-202, 1995] and the Row-diagonal Parity (RDP) code [reference is made to P. Corbett, et al., "Row-diagonal parity technique for enabling recovery from double failures in a storage array," (U.S. patent application US 20030126523 issued as U.S. Pat. No.: 6,993,701)], are distance three codes and achieve optimal storage efficiency but have non-optimal update complexity. The XCode (XC) [reference is made to L. Xu, et. al., "X-code: MDS array codes with optimal encoding," IEEE Transactions on Information Theory, pp. 272-276, 1999] and ZZS code [reference is made to G. V. Zaitsev, et. al., "Minimum-check-density codes for correcting bytes of errors," Problems in Information Transmission, vol. 19, pp. 29-37, 1983] achieve both optimal storage efficiency and optimal update complexity but do not generalize to distances greater than three.

A variant of the EvenOdd ($EO^+(p, d-1)$) code achieves column distances greater than three for certain array dimensions, but still has non-optimal update complexity [reference is made to M. Blaum, et. al., "MDS array codes with independent parity symbols," IEEE Transactions on Information Theory, vol. 42, pp. 529-542, 1996]. The present invention is similar to the $EO^+(p, d-1)$ code in that parity is computed along slopes of various values through the two-dimensional array of data and has the notion of logical data elements preset to zero (or some other fixed value). However, the present invention has a different set of preset data elements and so can remove dimension restrictions such as primality of the parameter p and the relationship of the number of columns and the number symbols per column to p.

Conventional high-distance RAID codes such as, for example, R51 and R6 are simple and have very good IO, but are impractical when storage efficiency is important.

Although conventional storage system parity techniques have proven to be useful, it would be desirable to present additional improvements. Conventional storage systems require excessive parity computation or complexity. Conventional storage systems further exhibit restrictive dimensionality constraints.

More recently, storage systems have been designed wherein the storage devices are nodes in a network (not just disk drives). Such systems may also use RAID type algorithms for data redundancy and reliability. The present invention is applicable to these systems as well. Though the description herein is exemplified using the disk array, it should be clear to someone skilled in the art how to extend the invention to the network node application or other systems built from storage devices other than disks.

What is therefore needed is a system, a computer program product, and an associated method for enabling efficient recovery from failures in a storage array without dimensionality constraints. Further, a storage system is desired that achieves greater redundancy with greater flexibility without a loss of performance experienced by conventional storage systems. The need for such system and method has heretofore remained unsatisfied.

SUMMARY OF THE INVENTION

The present invention satisfies this need, and presents a system, a computer program product, and an associated method (collectively referred to herein as "the system" or "the present system") for enabling efficient recovery from failures in a storage array. The present system has a column distance of q+1 such that a layout of the present system can tolerate the erasure of any q disks. The present system achieves near-optimal storage efficiency, optimal update complexity, and generalizes to arbitrary distances with relatively few array constraints.

The present system utilizes presets, data cells with known values that initialize the reconstruction process; reference is made to the EvenOdd code; M. Blaum, et. al., "EVENODD: an efficient scheme for tolerating double disk failures in RAID architectures," IEEE Transactions on Computers, vol. 44, pp. 192-202, 1995. The pattern of presets in the present application is significantly different from that of conventional codes. The presets allow resolution of parity equations to reconstruct data when failures occur. In one embodiment, additional copies of the layout of the present system are packed onto the same disks to minimize the effect of presets on storage efficiency without destroying the clean geometric construction of the present system. The present system has efficient XOR-based encoding, recovery, and updating algorithms for arbitrarily large distances, making the present system an ideal candidate when storage-efficient reliable codes are required.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 7 is comprised of FIGS. 7A and 7B and represents a diagram illustrating yet another embodiment of a layout of stripes and presets that increases the storage efficiency of the system of FIG. 1;

DETAILED DESCRIPTION OF PREFERRED EMBODIMENTS

Figure 1:
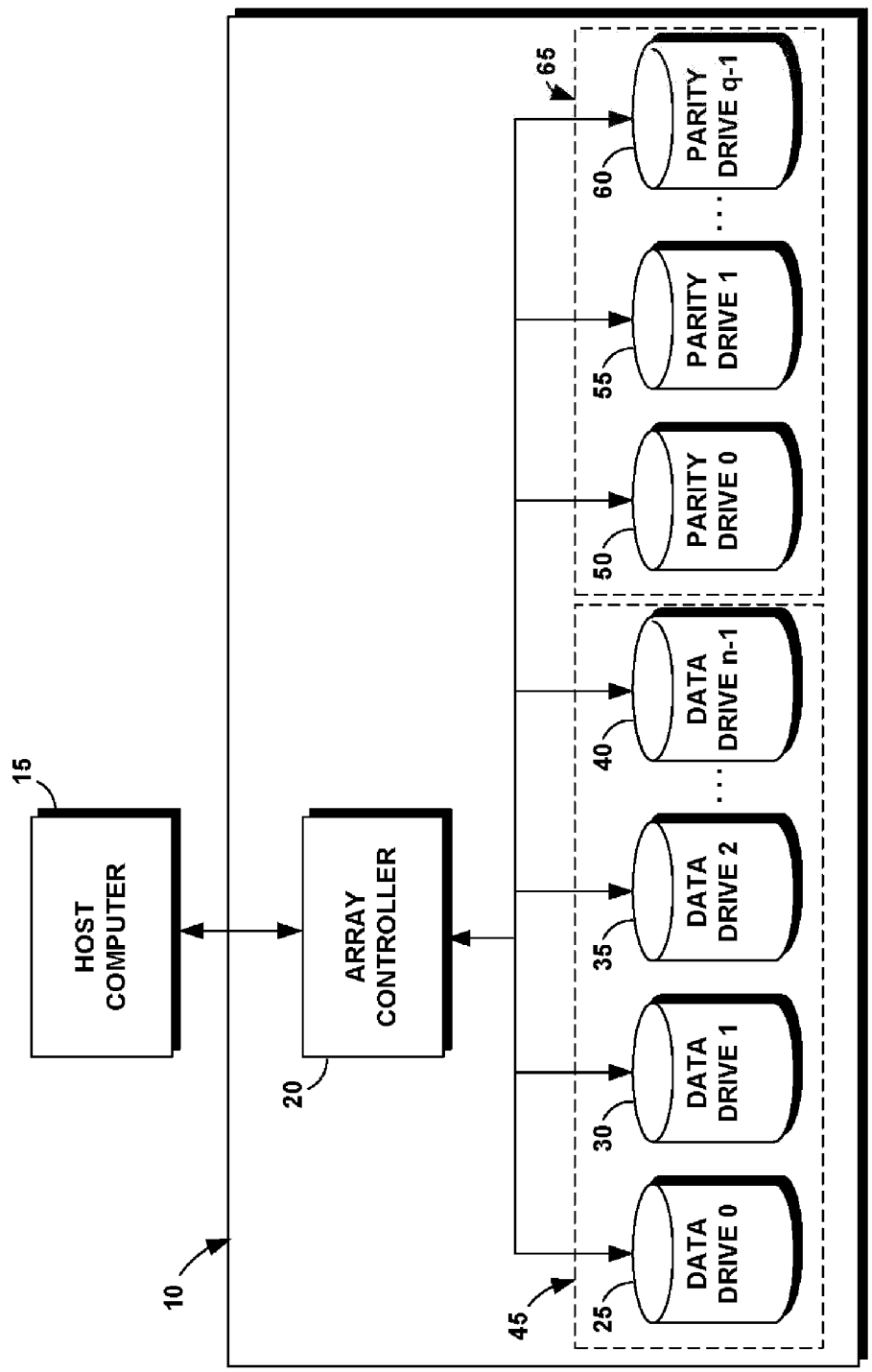
FIG. 1 is a schematic illustration of an exemplary environment in which a system and associated method for enabling efficient recovery from failures in a storage array may be used.

FIG. 1 illustrates an exemplary environment in which a system and associated method (collectively referred to as the "present system" 10) for enabling efficient recovery of data in a storage array can be used. A host computer 15 is connected to an array controller 20 of system 10. The host computer 15 stores data in an array of n data drives: computer 15 stores data in an array of n data drives: data drive 0, 25, data drive 1, 30, data drive 2, 35, through data drive n−1, 40 (referenced collectively as data drives 45). Parity is stored in q parity drives: parity drive 0, 50, parity drive 1, 55 through parity drive q−1, 60 (referenced collectively as parity drives 65).

Figure 2:
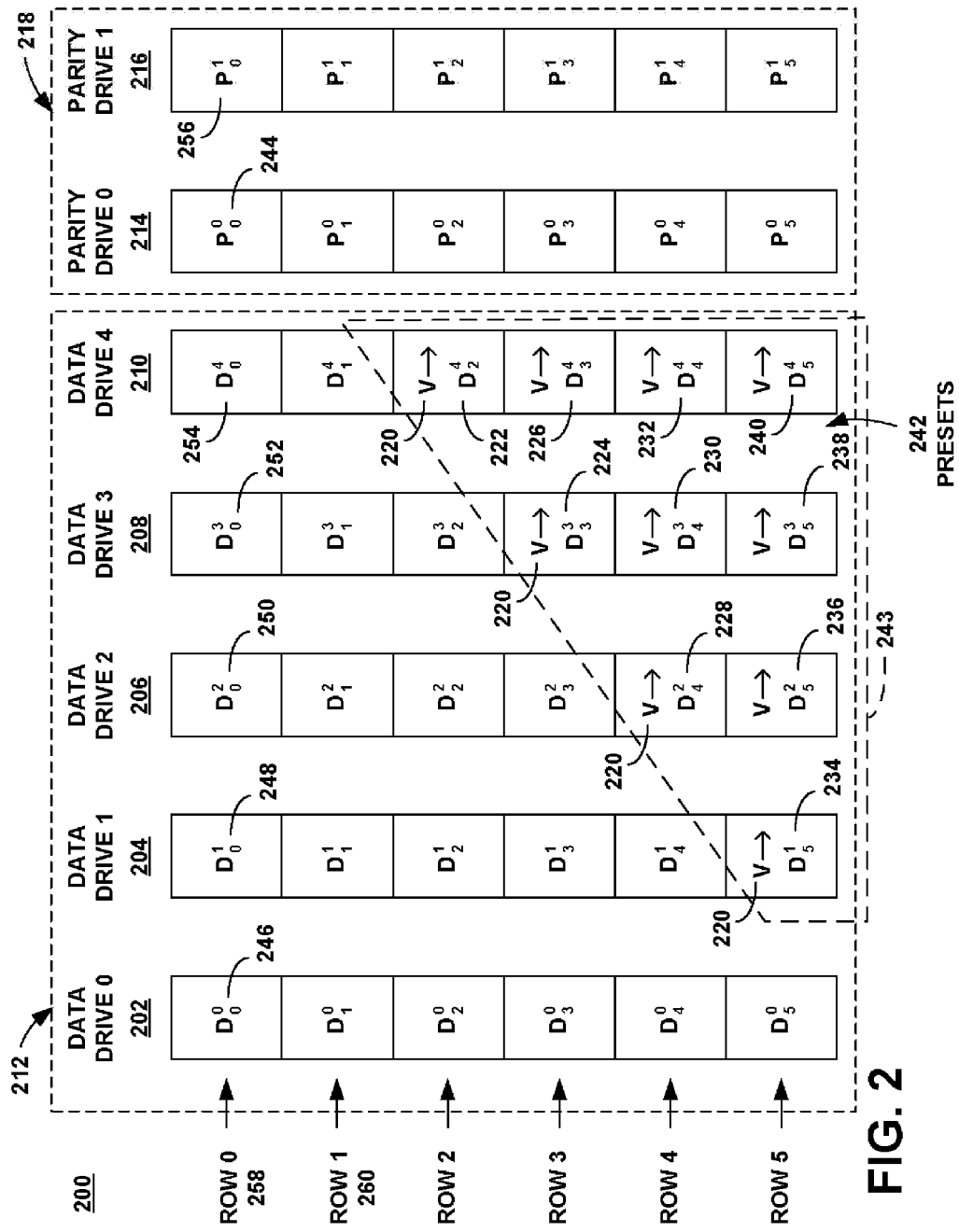
FIG. 2 is a diagram illustrating an exemplary layout of the present system showing a two-dimensional data layout and the presets in the system of FIG. 1.

With further reference to FIG. 2, system 10 comprises n+q columns (disks) and r rows of elements (symbols on a disk). An element (or symbol) is a chunk of data or parity on the disk having a predetermined size. The element may represent a bit, a byte, a sector, a block, or any other unit of fixed size. The constraint on the number of rows r is $r \geq (q-1) \cdot n$. The jth data column is denoted by $D^j, 0 \leq j < n$ and the ith data symbol in the jth column is denoted by $D_i^j, 0 \leq i < r$, where $0 \leq i < r$. Similarly, the kth parity column is denoted by $P^k, 0 \leq k < q$. System 10 enforces the following constraints:

$$D_i^j = 0 \text{ for } 0 \leq j < n \text{ and } r - j \cdot (q-1) \leq i < r; \quad (1)$$

$$P_i^k = \bigoplus_{j=0}^{n-1} D_{\langle i - j \cdot k \rangle_r}^j \quad (2)$$

Equation 1 initially assigns $(n-1)(q-1)(n)/2$ data elements to zero or some other fixed value, generating a preset region. The fixed data elements are referenced as presets. Geometrically, a preset region forms a generally triangular shape (referred to as triangle) 243 of width n−1 and height (n−1)(q−1). The area of this triangle 243 is for example, the lower right corner of a data matrix. Equation 2 assigns to column $P^k$ parities of an r×n data matrix taken along diagonals of slope k. The symbol $\langle i - j \cdot k \rangle_r$ means the value of $i - j \cdot k$ modulo r. Consequently, system 10 can manage diagonals wrapping around (due to the modulus operation) from the bottom of the array to the top, making a logical loop of the array.

FIG. 2 illustrates an exemplary layout 200 generated by system 10 where n=5 and q=2. Five disks are designated as data drives: data drive 0, 202, data drive 1, 204, data drive 2, 206, data drive 3, 208, and data drive 4, 210, collectively referenced as data drives 212. Two disks are designated as parity drives: parity drive 0, 214 and parity drive 1, 216, collectively referenced as parity drives 218. The array controller 20 manages data drives 212 and parity drives 218 and thus knows the boundaries of the array data blocks and the boundaries of the parity blocks.

A fixed value, V, 220, is inserted in data elements to form presets such as, for example, $D_2^4$, 222, $D_3^3$, 224, $D_3^4$, 226, $D_4^2$, 228, $D_4^3$, 230, $D_4^4$, 232, $D_5^1$, 234, $D_5^2$, 236, $D_5^3$, 238, and $D_5^4$, 240, collectively referenced as presets 242. Presets 242 form triangle 243 (shown in a dashed line) with a width of four data elements (n−1) and a height of four data elements ((n−1)(q−1)). Presets 242 comprise ten data elements: ((n−1)(q−1)(n)/2)).

Each row comprises data elements and parity elements. Parity elements in parity drive 0, 214, are defined by data elements in a horizontal row comprising the parity element. For example, parity element $P_0^0$, 244, is determined from data elements $D_0^0$, 246, $D_0^1$, 248, $D_0^2$, 250, $D_0^3$, 252, and $D_0^4$, 254.

Each parity element in parity drive 1, 218, is determined from data elements in a diagonal line of slope 1 across the data elements of the data drives 212. For example, parity element $P_0^1$, 256, of parity drive 1, 216, is determined from data elements $D_5^1$, 234, $D_4^2$, 228, $D_3^3$, 224, $D_2^4$, 222, and $D_0^0$, 246. This diagonal path wraps from the top edge of a two-dimensional array formed by the data elements of data drives 212 to the bottom edge of the array between data elements $D_0^0$, 246 and $D_5^1$, 234. The diagonal path for each of the parity elements of parity drive 1, 216, has a slope of 1 within the array formed by data elements of data drives 212 but has a different starting point and wraps from the top of the array to the bottom at a different location.

Additional parity drives may be used that comprise diagonal paths with a slope other than 1. Each parity column is generated from a stripe of a different slope through the array of data elements in the data disks 212 with a different starting point for each path and a different wrapping point from the top to the bottom.

A row 0, 258, and a row 1, 260, are comprised of data and parity with no preset values V, 220. While presets 242 are required, no limit is placed on the number of rows comprised completely of data. Consequently, system 10 is flexible in dimensionality constraints compared to conventional storage array systems.

Figure 3:
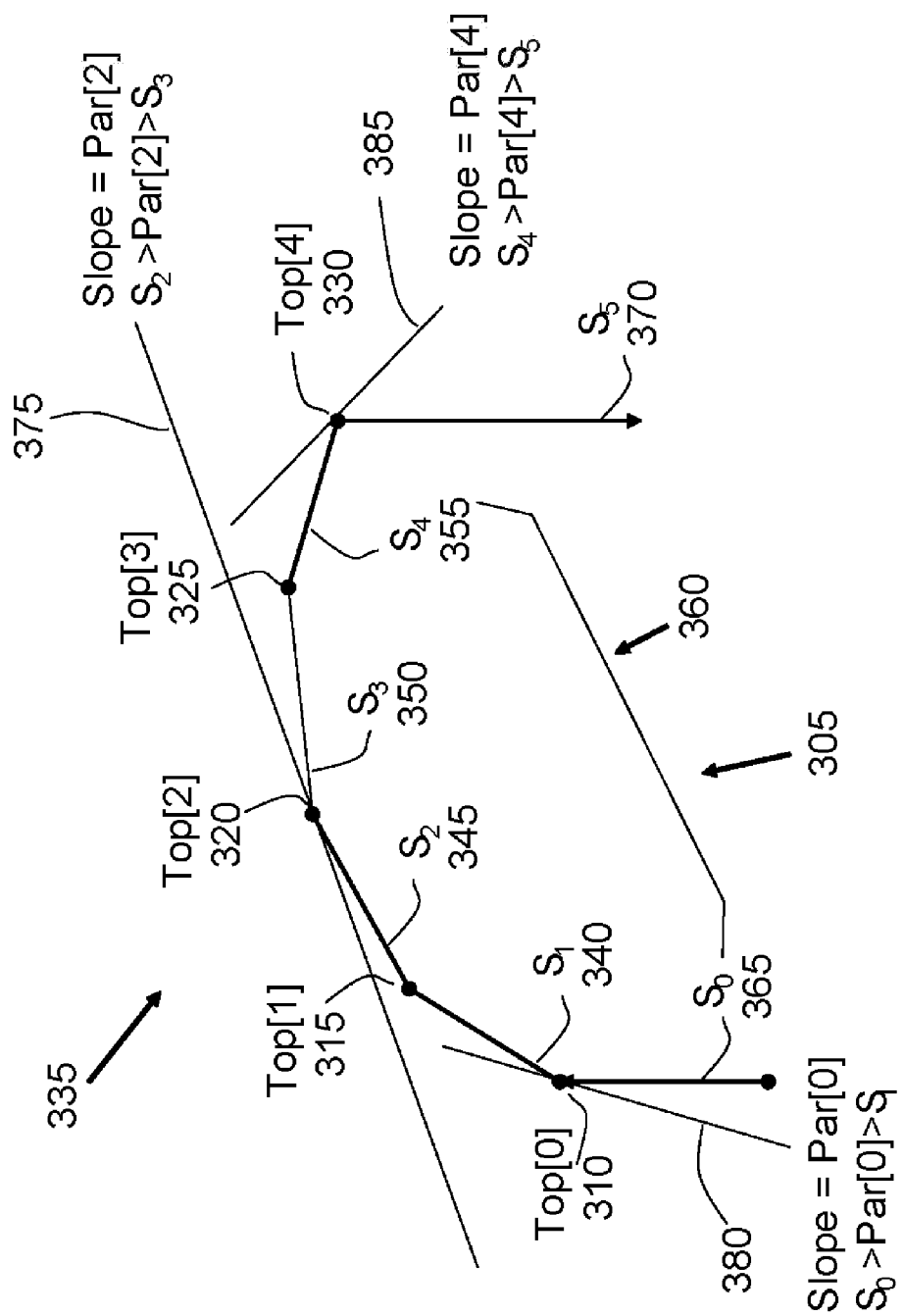
FIG. 3 is a diagram representing a convex hull defined by the topmost unknown data symbols in a layout of stripes and presets in the system of FIG. 1.

In general, system 10 can recover from the failure or erasure of any x data disks utilizing any x parity disks and the remaining non-failed data disks whenever system 10 comprises $q \geq x$ parity disks. The topmost unknown elements from each of the x missing data disks are initially the topmost row elements of the missing disks. However, in a general case, the topmost unknown elements form a downward facing convex pattern as illustrated by FIG. 3. A convex hull 305 is defined by the topmost unknown elements of the lost data disks, e.g., Top[0] 310, Top[1] 315, Top[2] 320, Top[3] 325, and Top[4] 330, collectively referenced as topmost points 335. Slopes S1 340, S2 345, S3 350, and S4 355 (referenced collectively as slopes 360) define a convex surface of the convex hull 305. An initial slope, S0 365, is greater than the slope of Par[0], the slope of the first of the x parity disk used in the recovery process. A slope S5 370 is less than the slope Par[4], the slope of the last parity disk used in the recovery. Because there are at most x topmost unknown elements, the top surface of the convex hull 305 formed by the unknown elements 335 is defined by at most x−1 lines of distinct slope, as indicated by slopes 360.

The pigeon-hole principle indicates that there exists at least one parity column whose slope is distinct from the slopes that compose the top surface of the convex hull 305. An element from this parity column necessarily touches the convex hull 305 at exactly one point. For example, system 10 can solve for the top element Top[2] 320) of the third erased data column using an element from the third parity column shown as line 375 that is tangent to the convex hull 305.

Remaining inputs to this parity element are either above the convex hull or wrap around from the top of the array to the bottom of the array. In the wrap-around case, the input is a preset with a value such as, for example, zero. Otherwise, the input is known because it is above the topmost unknown elements in the data matrix. System 10 thus solves for the one unknown data element by a XOR of this parity with all of its known inputs. System 10 successfully reduces the number of unknown data elements by one. By repeatedly applying this argument, system 10 solves for all the lost or erased data elements.

System 10 has column distance q+1. Assume that $0 \leq x \leq q$ data disks and that q−x parity disks are failed or erased. For example, x data disks are erased and x parity disks remain. System 10 allows these x erased data disks to be rebuilt from any x parity disks and the remaining non-failed data disks.

Figure 4:
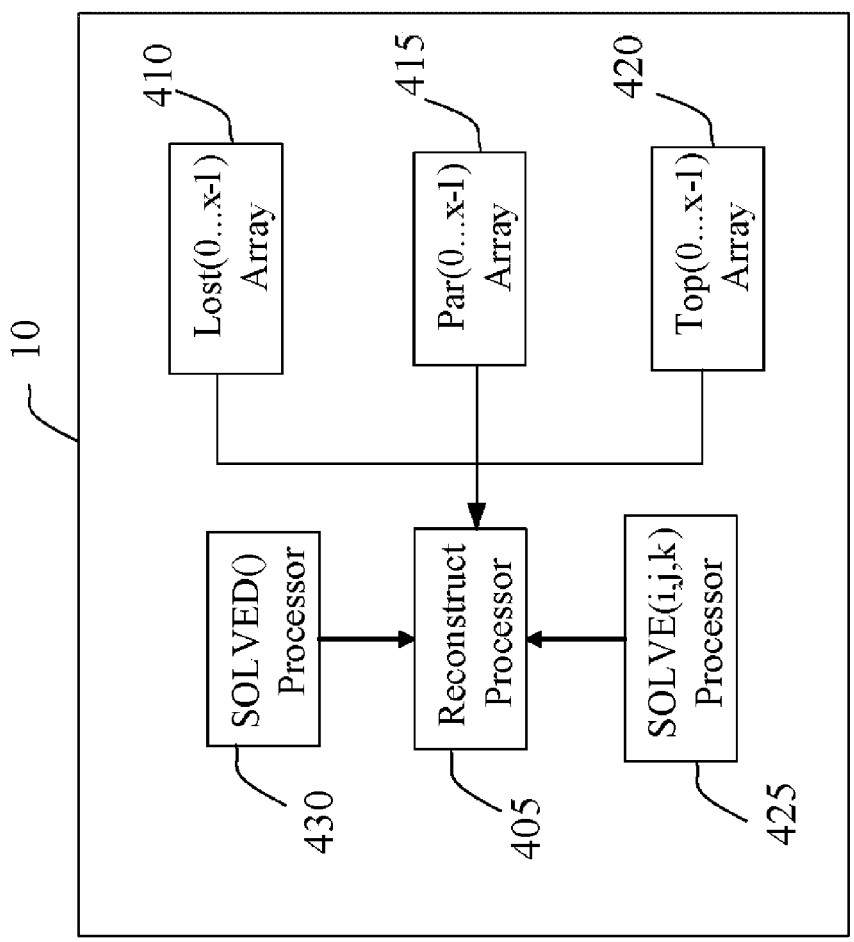
FIG. 4 is a block diagram illustrating a high-level hierarchy of the system of FIG. 1.

FIG. 4 is a block diagram of a high-level architecture of system 10. System 10 comprises a reconstruct processor 405. The reconstruct processor 405 reconstructs x erased columns with x available parity columns. Each recovered data symbol requires at most (n−1) XORs. Inputs to the reconstruct processor 405 are:

a Lost(0 . . . x−1) array 410 that indexes erased data columns in increasing order.

a Par(0 . . . x−1) array 415 that indexes available parity in decreasing slope order.

a Top(0 . . . x−1) array 420 where T(I) indexes which row of column I contains the top-most unknown element (initially all zeros or other fixed value).

a SOLVE(i, j, k) processor 425 that solves for unknown element $D_i^j$ using an element from $P^k$. $D_i^j$ is the only missing input to the element of $P^k$, else the SOLVE (i, j, k) processor 425 returns false.

a SOLVED( ) processor 430 that returns true if the erased data has been recovered.

The reconstruct processor 405 implements the following pseudocode that is also illustrated by process 900 of FIG. 9:
While Top[I]≠r for any I=0, . . . , x−1
  For I=0, . . . ,x−1
    While (SOLVE(Top[I], Lost[I], Par[I]))
      Top[I]++

SOLVE (i,j,k)
i'←−i+j*k // index of the participating parity element of slope k
If (i=r) return False // the column is complete
Else If (i≧r−j*(q−1)) $D_i^j$→0 // preset
Else If (all data and parity elements participating in $P_{i'}^k$ except $D_i^j$ are not available) Return False
Else $D_i^j$→ XOR of all data and parity elements participating in $P_{i'}^k$ except for the lost data element $D_i^j$ and Return True.

Providing the external loop makes progress on every iteration, the reconstruct processor 405 successfully solves for all erased data symbols.

Figure 9A:
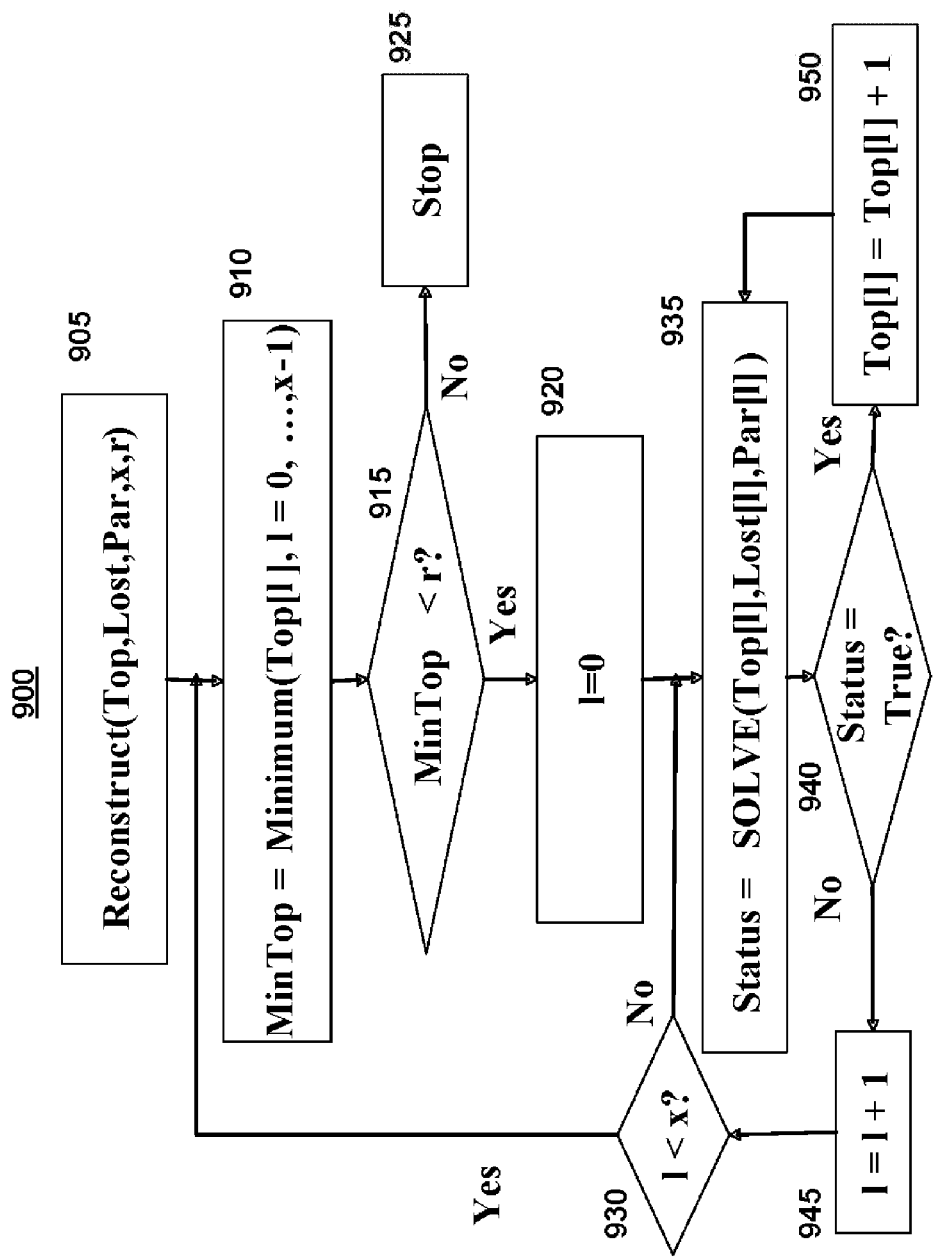
FIG. 9 is comprised of FIGS. 9A and 9B, illustrating a flow chart reflective of an exemplary pseudocode that is implemented by a reconstruct processor according to one embodiment of the present invention.
Figure 9B:
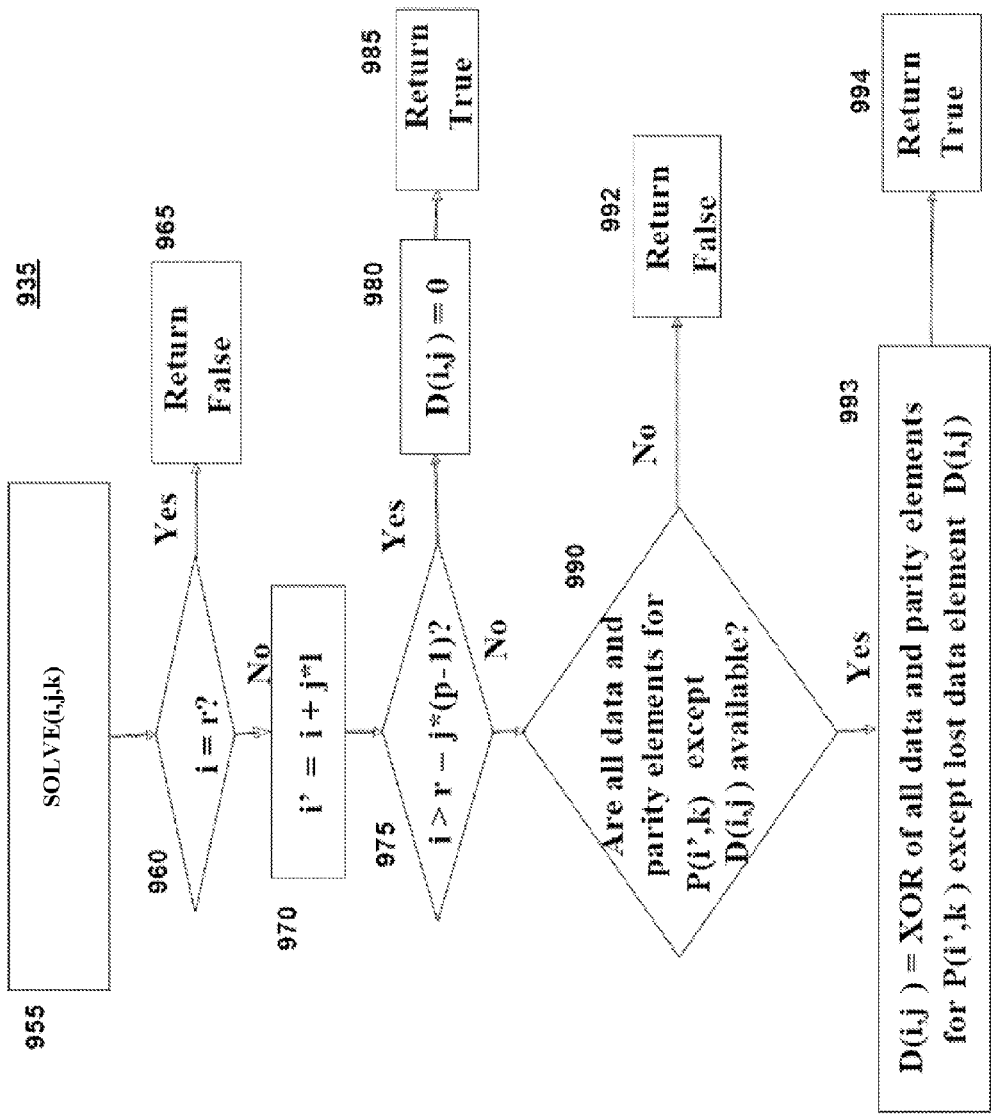

Referring now to FIG. 9 (FIGS. 9A, 9B), process 900 starts at step 905, by accepting the input arrays Top, Lost and Par, and a positive integer x, which is the number of lost disks, and r, which the number of rows to reconstruct in each disk. In step 910, process 900 finds the topmost lost element amongst all the lost disks.

In step 915, if any topmost element is less than r, this means that there are still more lost elements to be reconstructed, and process 900 proceeds to step 920. Step 920 initializes the lost disk iterator index I to zero and proceeds to step 935. In steps 920, 935,940,950, and 930, process 900 loops over all the lost disks, one at a time, and tries to reconstruct as many elements in step 935 on each disk as possible. Step 835 is described in more detail in FIG. 9B.

In step 915, if all topmost elements are at least r, then the lost elements in all the disks have been reconstructed, and so process 900 proceeds to step 925, which terminates process 900.

Steps 930 and 945 vary the value of I from 0 through x−1. In steps 935, 940, and 950, process 900 reconstructs as many elements that can be reconstructed in lost disk Lost[I]. In step 940, if process 900 determines that no more elements can be reconstructed on disk Lost[I], it proceeds to the next lost disk by proceeding to step 945, else it proceeds to reconstruct the next element on disk Lost[I] by proceeding to step 950. In step 945, process 900 increments the lost disk counter I, and in step 930, process 900 checks if all the x lost disks have been looped over. If the determination is affirmative, process 900 returns to stop 920, else it returns to step 935.

At step 955, process 951 solves for lost element i on disk j, using parity disk k. At decision step 960, if process 935 determines that the index of the element to be reconstructed is larger than the number of rows in each disk that are participating in the erasure code, it returns a False indication; else it proceeds to step 970.

In step 970, process 935 determines the index of the parity element on parity disk k in which the lost data element D(i,j) participates. In step 975, process 935 determines if the lost data element is part of the preset region. If the determination is affirmative, process 935 initializes the lost data element to zero in step 980, and then returns True in step 985. Otherwise, if process 935 determines that the lost data element is not part of the preset region, it proceeds to step 990.

In step 990, process 935 determines if all the elements needed to reconstruct the lost data element are available and if not, it returns False; else it proceeds to step 993. In step 993, process 935 computes the lost data element value using all the available data and parity elements that participate in the computation of the parity element P[i',k] and returns True.

Consider a convex hull defined by the Top(1 . . . x) array 420. Denote $S_i$ as the slope of the convex hull 305 between column D[i−1]and D[i], $S_0 = \infty > P[0]$ 310, and $S_x = -\infty < P[x-1]$,as depicted in FIG. 3. The reconstruct processor 405 solves for the top element of D[i] if $S_i > P[i] > S_i 1$. At an initial i where $P[i] > S_{i+1}$, $S_i \geq P[i-1] > P[i] > S_i + 1$. Such an i exists because P[i] is strictly increasing and $S_i$ begins above P[i] but ends below P[i]. Consequently, system 10 can solve for the top element of column D[i] using slope P[i], guaranteeing that progress is made every iteration of the external loop.

The storage efficiency E represents the fraction of the storage space that can be used for independent data. Let D denote the number of independent data symbols and T denotes the total number of symbol blocks used by the layout. The storage efficiency of a layout is defined as:

$$E = \frac{D}{T}. \tag{3}$$

The optimal storage efficiency of a distance q+1 code with n data disks is given by an maximum distance separable (MDS) code:

$$E_{MDS} = \frac{n}{n+q}. \tag{4}$$

System 10 comprises a near-MDS code in the sense that the storage efficiency of system 10 can be made arbitrarily close to $E_{MDS}$.

The number of independent data symbols in an (n, r, q) layout of system 10 is given by the number of data symbols nr in the data matrix minus the number of presets $(q-1)(n-1)(n)/2$. The total number of blocks used by the (n, r, q) layout of system 10 is the size of the matrix $(n+q)r$. The storage efficiency of system 10 is thus:

$$E = \frac{nr - (q-1)(n-1)(n)/2}{(n+q)r}. \quad (5)$$

The term r can be written as $kn(q-1)$ for $k \geq 1$ not necessarily an integer. Assuming that n is large, the storage efficiency of system 10 can be written as:

$$E \approx \left(\frac{n}{n+q}\right) \cdot \left(1 - \frac{1}{2k}\right) \quad (6)$$

As the number of rows r increases so does k so that the storage efficiency of system 10 approaches $E_{MDS}$. In actuality, it is easy to obtain much higher storage efficiencies for system 10, as it will be explained later in greater detail.

The update complexity is the average number of parity symbols affected by a change in a data symbol [reference is made to L. Xu, et. al., "X-code: MDS array codes with optimal encoding," IEEE Transactions on Information Theory, pp. 272-276, 1999]. In system 10, each data symbol is an input to q parity symbols, one from each parity column. Consequently, the update complexity for system 10 with distance q+1 is q which is the optimum for a distance q+1 code.

Update complexity is particularly important in a storage systems model because symbol reads and symbol writes (IOs) dominate over computation time. For most storage system models including system 10, IOs are directly related to update complexity:

$$IOs = 2(UC+1) \quad (7)$$

This IO cost corresponds to the cost of reading the original data symbol and all its affected parities and then writing the new data symbol and modified parity symbols. Equation (7) does not hold for some types of inefficient codes used by conventional storage systems models.

In Table 1, Table 2, and Table 3, a number of conventional approaches are compared with the present system. All of the conventional approaches that achieve Average IOs better than the optimum (as indicated by an * in the tables) do so because their storage efficiency is well below optimal. Because these conventional systems have fewer data columns than parity columns, they can modify a data symbol without reading the old value of a symbol or a parity, saving in IO cost.

Various conventional distance 3 approaches are compared with system 10 in Table 1. The conventional $R51^-(a)$ code has a columns of data, a mirror columns, and one RAID-5 parity column. The conventional R6(a×b) code has ab columns of data arranged logically in an a×b matrix and a+b RAID-5 parity columns, one for each matrix row and column. The conventional XC(p) code has p total columns and p rows per column (where p is a prime number), where the last two symbols in each column are parity symbols [reference is made to L. Xu, et. al., "X-code: MDS array codes with optimal encoding," IEEE Transactions on Information Theory, pp. 272-276, 1999].

TABLE 1

Comparison of system 10 with conventional distance three codes.

| d = 3 | AvgIOs | Efficiency | Array Constraints |
|---|---|---|---|
| $R51^-(2)$ | 4* | 40% | r × 5 for any r |
| $R51^-(a)$ | 5* | $\frac{a}{2a+1}$ | r × (2a + 1) for any r, a |
| R6(2 × 2) | 5* | 50% | r × 8 for any r |
| R6(a × b) | 6 | $\frac{ab}{ab+a+b}$ | r × (ab + a + b) for any r, a, b |
| XC(p) | 6 | $\frac{p-2}{p}$ | p × p for prime p |
| ZZS(p) | 6 | $\frac{p-2}{p}$ | ((p − 1)/2) × p for prime p |
| System 10 | 6 | $\frac{n}{n+2} - \varepsilon_r$ | r × (n + 2) for any n, r ≥ n |
| EO(p) | >6 | $\frac{p}{p+2}$ | (p − 1) × (p + 2) for prime p |
| BR(p, n) | >6 | $\frac{n}{n+2}$ | n ≤ p with (p − 1) × (n + 2), for prime p |
| RDP(p, n) | >6 | $\frac{n}{n+2}$ | n ≤ p − 1 with (p − 1) × (n + 2) for prime p |

The conventional code ZZS(p) has (p−1)/2 rows and p columns [reference is made to G. V. Zaitsev, et. al., "Minimum-check density codes for correcting bytes of errors," Problems in Information]. The conventional code EO(p) has p columns (p a prime number) of data and two columns of parity with p−1 symbols per column [reference is made to M. Blaum, et. al., "EVENODD: an efficient scheme for tolerating double disk failures in RAID architectures," IEEE Transactions on Computers, vol. 44, pp. 192-202, 1995]. The conventional code BR(p, n) has n≤p data columns for some prime p, two parity columns and (p−1) rows [reference is made to M. Blaum, et. al., "On lowest density MDS codes," IEEE Transactions on Information Theory, vol. 45, pp. 46-59, 1999].

The conventional RDP(p,n) code has n≤p−1 data columns for some prime p, two parity columns and (p−1) rows [reference is made to P. Corbett, et al., "Row-diagonal parity technique for enabling recovery from double failures in a storage array, (U.S. patent application 20030126523)]. As can be seen in the table, system 10 has the Average IOs equal to that for the MDS codes XC and ZZS and better Average IOs than the EO, BR or RDP codes. In all these cases, system 10 has fewer array constraints. In addition, system 10 has near optimal efficiency. The R51- and R6 codes have excellent Average IOs, but have significantly less desirable efficiency compared to system 10.

Table 2 compares various conventional distance 4 codes with system 10. The R51(a) code has a columns of data, one column of RAID-5 parity, and a+1 mirror columns. The $R6^+$(a×b) code has ab columns of data arranged logically in an a×b matrix and a+b+1 RAID-5 parity columns, one for each matrix row and column and one for the entire matrix. EO⁺(p, 3) has p columns of data, for some prime p, and three columns of parity with p−1 symbols per column [reference is made to M. Blaum, et. al., "MDS array codes with independent parity symbols," IEEE Transactions on Information Theory, vol. 42, pp. 529-542, 1996]. As noted above in connection with Table 1, system 10 improves on Average IOs over EO⁺(p, 3) but has nearly equal efficiency. System 10 has significantly better efficiency than the R51 and R6+ codes.

TABLE 2

Comparison of system 10 with conventional distance four codes.

| d = 4 | IOs | Efficiency | Array Constraints |
|---|---|---|---|
| R51(2) | 5* | ≈33% | r × 6 for any r |
| R51(a) | 6* | $\frac{a}{2a+2}$ | r × (2a + 1) for any r, a |
| R6⁺(2 × 2) | 7* | ≈44% | r × 9 for any r |
| R6⁺(a × b) | 8 | $\frac{ab}{(a+1)(b+1)}$ | r × (a + 1)(b + 1) for any r, a, b |
| System 10 | 8 | $\frac{n}{n+3} - \varepsilon_r$ | r × (n + 3) for any n, r ≧ 2n |
| EO+(p, 3) | >8 | $\frac{p}{p+3}$ | (p − 1) × (p + 3) for prime p |

Table 3 compares various conventional higher distance codes with system 10. The conventional EvenOdd⁺(p, d−1) approach has p columns of data and d−1 columns of parity with p−1 symbols per column [reference is made to M. Blaum, et. al., "MDS array codes with independent parity symbols," IEEE Transactions on Information Theory, vol. 42, pp. 529-542, 1996]. System 10 has improved Average IOs and efficiency comparable to EO+(p,d−1) and fewer constraints on the array dimensions.

TABLE 3

Comparison of system 10 with conventional distance d ≧ 5 codes.

| d ≧ 5 | IOs | Efficiency | Array Constraints |
|---|---|---|---|
| System 10 | 2d | $\frac{n}{n+d-1} - \varepsilon_r$ | r × (n + d − 1) for any n, r ≧ (d − 2)n |
| EO⁺(p, d − 1) | >2d | $\frac{n}{n+d-1}$ | (p − 1) × (p + d − 1) for some prime p |

The presets in system 10 can either be physically located on disks or logically preset without consuming physical disk space. The logical presets do not waste physical disk blocks whereas the physical presets consume and therefore waste storage.

In one embodiment, storage efficiency of system 10 is improved by reducing the number of presets. In another embodiment, storage efficiency of system 10 is improved by storing nonzero symbols from another instance of system 10 in the disk blocks designated for the presets of the first instance of system 10, that is, converting physical presets to logical presets and using the physical blocks for another instance of system 10.

Let Z be the total number of preset elements (both logical and physical) and W be the number of wasted preset disk elements in a specific layout. Also, let N=nr be the number of data symbols and let T=(n+q)r be the total number of symbols. The storage efficiency of the layout of system 10 is:

$$E = \frac{N - Z}{T - (Z - W)} \quad (8)$$

$$= \left(\frac{N}{T}\right)\left(\frac{1 - \frac{Z}{N}}{1 - \frac{Z - W}{T}}\right) \quad (9)$$

$$\approx E_{MDS}\left(1 - \frac{Z}{N}\right)\left(1 + \frac{Z - W}{T}\right) \quad (10)$$

since from Equation (4) N/T=$E_{MDS}$. The approximation in Equation (10) relies on the fact that Z−W is much smaller than T.

Figure 5:
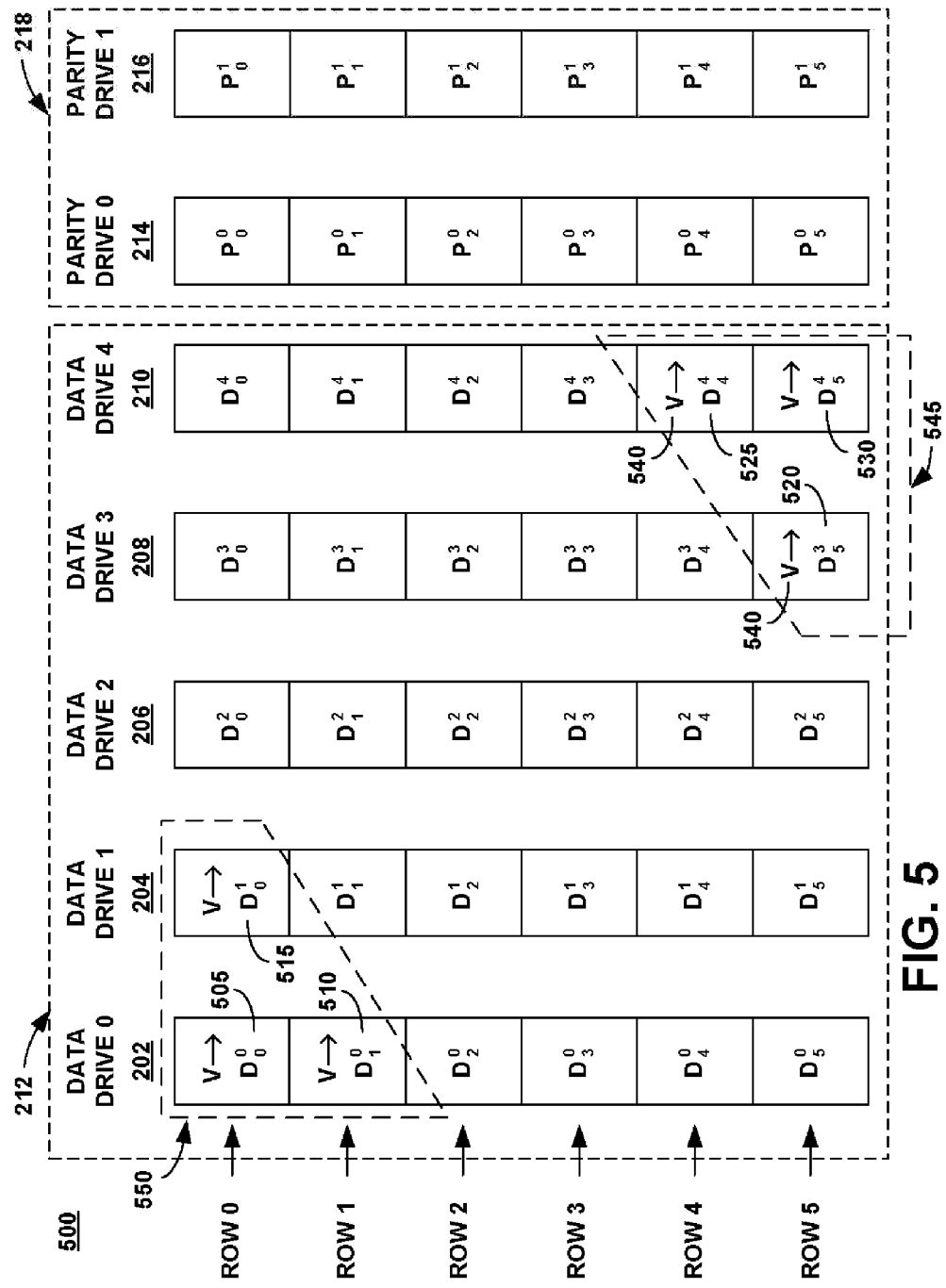
FIG. 5 is a diagram illustrating one embodiment of a layout of stripes and presets that increases the storage efficiency of the system of FIG. 1.

The storage efficiency given in Equation (6) is for a layout in which Z=(q−1)(n−1)(n)/2 presets and W=Z. An exemplary enhanced layout 500 for system 10 is shown in FIG. 5. Enhanced layout 500 requires only $(q-1)\lfloor n/2 \rfloor \lceil n/2 \rceil$ presets. Data elements $D_0^0$ 505, $D_1^0$ 510, $D_0^1$ 515, $D_5^3$ 520, $D_4^4$ 525, and $D_5^4$ 530 are preset to some predetermined fixed value V, 540, forming a triangular preset region 545 and a triangular preset region 550.

Presets for enhanced layout 500 are those data elements above the inputs to either $P_0^0$ or $P_{(q-1)\lfloor n/2 \rfloor}^{q-1}$ but not above the inputs to both $P_0^0$ and $P_{(q-1)\lfloor n/2 \rfloor}^{q-1}$. Preset region 545 has width $\lfloor (n-1)/2 \rfloor$ and height $(q-1)\lfloor (n-1)/2 \rfloor$. Preset region 550 has width $\lceil (n-1)/2 \rceil$ and height $(q-1)\lceil (n-1)/2 \rceil$. Consequently, preset region 545 and preset region 550 together comprise a count of $(q-1)\lfloor (n/2) \rfloor \lceil (n/2) \rceil$ presets. As proof that enhanced layout 500 provides a sufficient number of presets for system 10 to adequately reconstruct data, preset region 545 and preset region 550 can be combined together into a rectangle of dimension (q−1)n/2×n/2 or (q−1)(n−1)/2×(n+1)/2.

The improved storage efficiency is given by:

$$E \approx \left(\frac{n}{n+q}\right)\left(1 - \frac{1}{4k}\right) \quad (11)$$

since r=kn(q−1). As before, no parity element has independent inputs that wrap around from top to the bottom without encountering a preset element.

Both equation (6) and equation (11) assume that W=Z; i.e., all preset blocks are wasted space. In one embodiment, disk blocks are not wasted. Instead, the preset blocks comprise unrelated data such as, for example, data from another code instance of system 10. System 10 achieves this reduction in wasted space without the introduction of an unwieldy mapping from algorithmic space to physical space.

The preset data elements need not occupy space on the disk. Instead, the preset data elements can be used to store extra intradisk redundancy. In one embodiment, the preset data elements are cut away using striping and an indexing technique. The striping technique copies several instances of the code of system 10 vertically onto a set of desired disks. For each instance, however, the striping technique shifts all the columns one to the right with wrap-around (in the same manner striping is used to spread parity out on all disks).

With n+q total disks and n+q vertical copies, each column of data or parity appears on each disk exactly once. Consequently, each disk has exactly the same number of preset data elements. These preset data elements can be used as additional intradisk parity (now that all disks have the same number of such blocks). Furthermore, these preset data elements can all be shifted to the same location by using indexing to remember each data block's logical location as opposed to its new physical location. System 10 then simply chops off all the rows of zeros. Thus system 10 is able to preserve the desired logical data and parity relationship of system 10 without wasting space by keeping zeroed out blocks of data.

Figure 6:
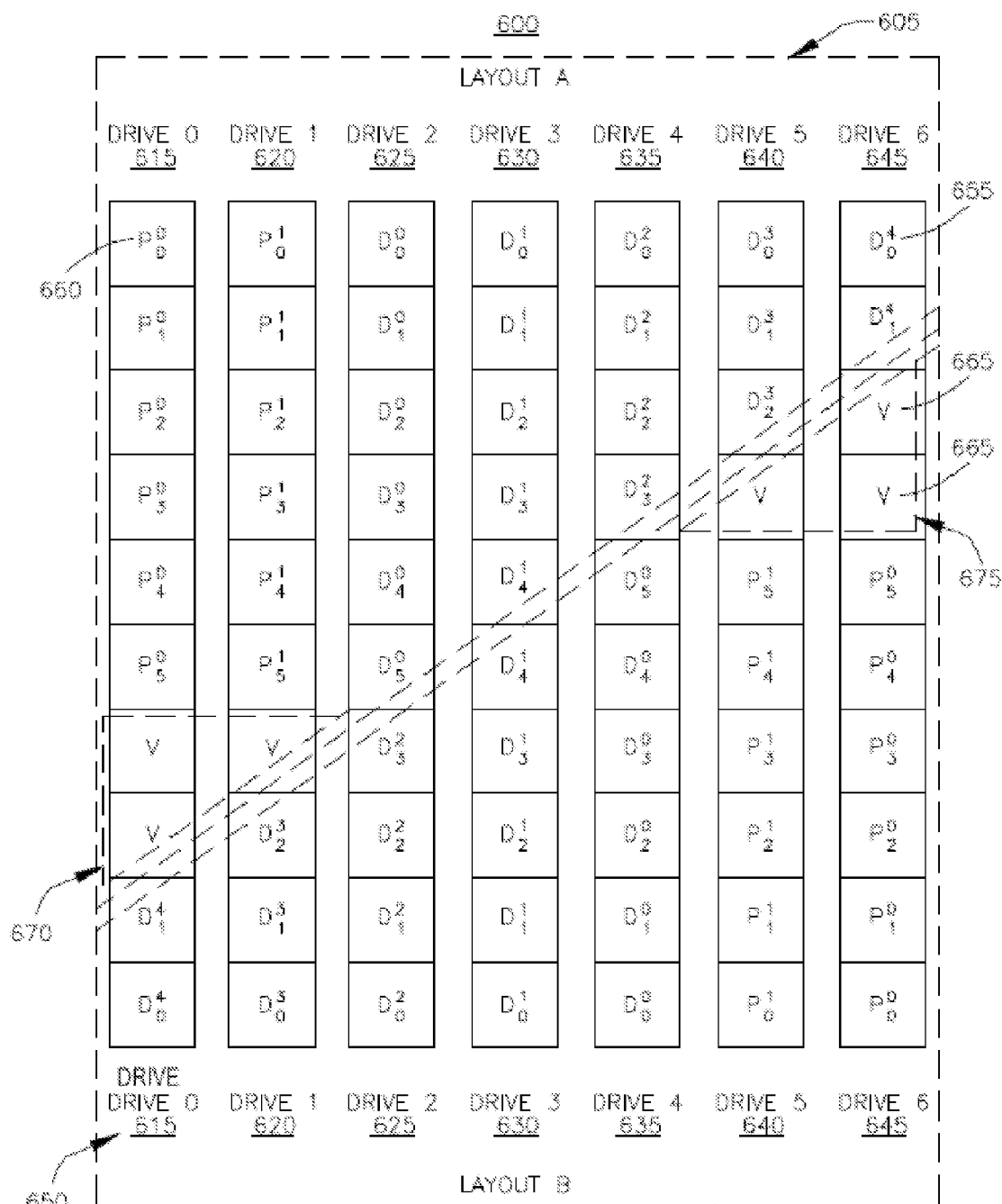
FIG. 6 is a diagram illustrating a further embodiment of a layout of stripes and presets that increases the storage efficiency of the system of FIG. 1.

FIG. 6 illustrates in an exemplary manner another embodiment in which wasted space is reduced. A mirrored layout 600 comprises a layout A, 605, and a layout B, 610, arranged on the same disks: a drive 0, 615, a drive 1, 620, a drive 2, 625, a drive 3, 630, a drive 4, 635, a drive 5, 640, and a drive 6, 645 (collectively referenced as drives 650). Drives 650 comprise data blocks such as $D_0^4$, 655, parity blocks such as $P_0^0$, 660, and preset blocks such as V 665. Layout A, 605, is arranged to use some of the preset blocks of layout B, 610, for storing data and parity symbols. Layout B, 610, is arranged to use some of the preset blocks of layout A, 605, for storing data and parity symbols. The preset blocks form preset triangle A, 670, and preset triangle B, 675. Preset triangle A, 670, and preset triangle B, 675, each have a width of (q−1) and height of (q−1)². The number of waste space blocks is W=(q+1)(q)(q−1)/2. As proof, triangle A, 670, and triangle B, 675 can be combined into a (q−1) q×(q+1) rectangle.

System 10 accesses elements from the mirrored layout 600 by mapping $D_i^j$ to $D_{n+q-i-1}^{r-j-1}$, a very simple transformation. The storage efficiency of the mirrored layout 600 can be derived from equation (10) as:

$$E \approx \left(\frac{n}{n+q}\right)\left(1 - \frac{q}{2kn} - \frac{1}{4k^2}\right) \quad (12)$$

Wasted space can be further reduced in yet another embodiment, as illustrated by Double Layout 700 of FIG. 7 (FIGS. 7A, 7B). A layout A, 705 (shown in a dashed outline), shows a graphical representation of one embodiment as in FIG. 5. In this layout, approximately half of the data columns are logically partitioned into a left half 710 and the remaining data columns are partitioned into a right half 715. The missing triangular portions of each set of data columns represents the logical presets 545 and 550. The parity columns are labeled 720. To achieve the Double Layout 700, first Layout B, 725 (shown in a dashed outline) is constructed as follows: The parity columns 720 are moved between data columns 710 and data columns 715. Data columns 715 are then vertically inverted, forming layout B, 725. Second, layout C, 730 (shown in a dashed outline), is constructed by copying layout B, 725, and inverting the copied layout, and then cyclically rotating the columns of this new layout [(n=q/2] columns to the right, forming layout C, 730. Layout C, 730, is nested on layout B, 725. In layout C, the parity columns are split into two sets of columns each approximately half of the parity columns; one set is moved to the left side of the array, the other set is moved to the right side of the array. If the total number of disks n+q is even, system 10 achieves a nice fit in this embodiment with only $(q-1)\lfloor q/2 \rfloor \lceil q/2 \rceil$ wasted blocks per layout. This fit is off by a column if n+q is odd; in this case there are $(q-1)\lfloor (n+q)/2 \rfloor + <q>_2$) extra wasted symbols split between layout B, 725, and layout C, 730.

Efficiency of layout 700 is:

$$E \approx \left(\frac{n}{n+q}\right)\left(1 - \frac{q}{4kn} - \frac{1}{16k^2}\right) \quad (12)$$

when n+q is even. The storage efficiency is slightly worse when n+q is odd because layout C, 730, and layout B, 725, do not nest tightly. A transformation to achieve layout 700 is as follows:

$$D_i^j = \begin{cases} D_i^j & \text{if } j < \lfloor n/2 \rfloor \\ D_{r-i-1}^{j+q} & \text{if } \lfloor n/2 \rfloor \le j < n \\ D_i^{j-\lceil n/2 \rceil} & \text{if } j \ge n \end{cases}$$

Figure 8A:
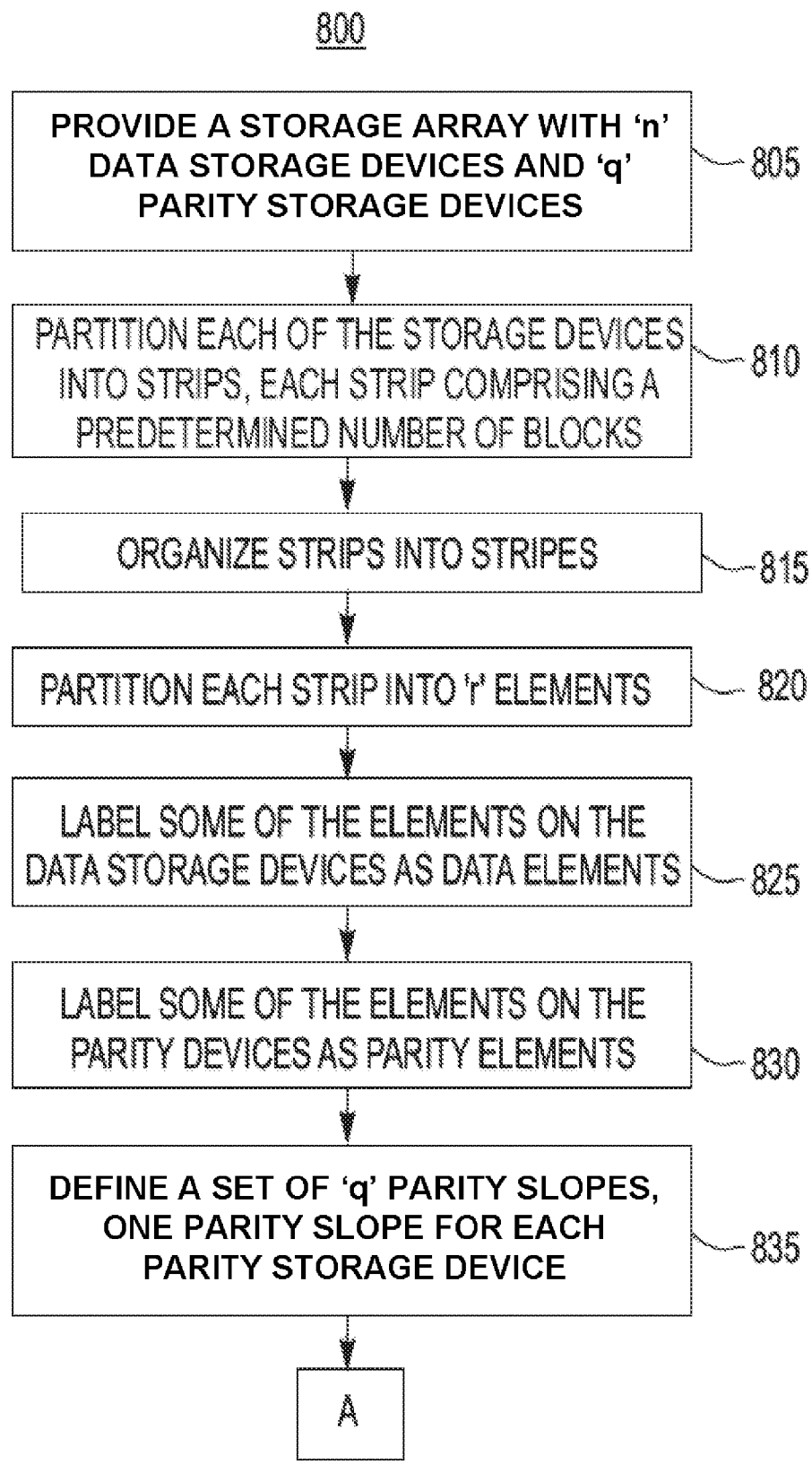
FIG. 8 is comprised of FIG. 8A, FIG. 8B, and FIG. 8C and represents a process flow chart illustrating a method of operation of an array controller executing the system of FIG. 1.
Figure 8B:
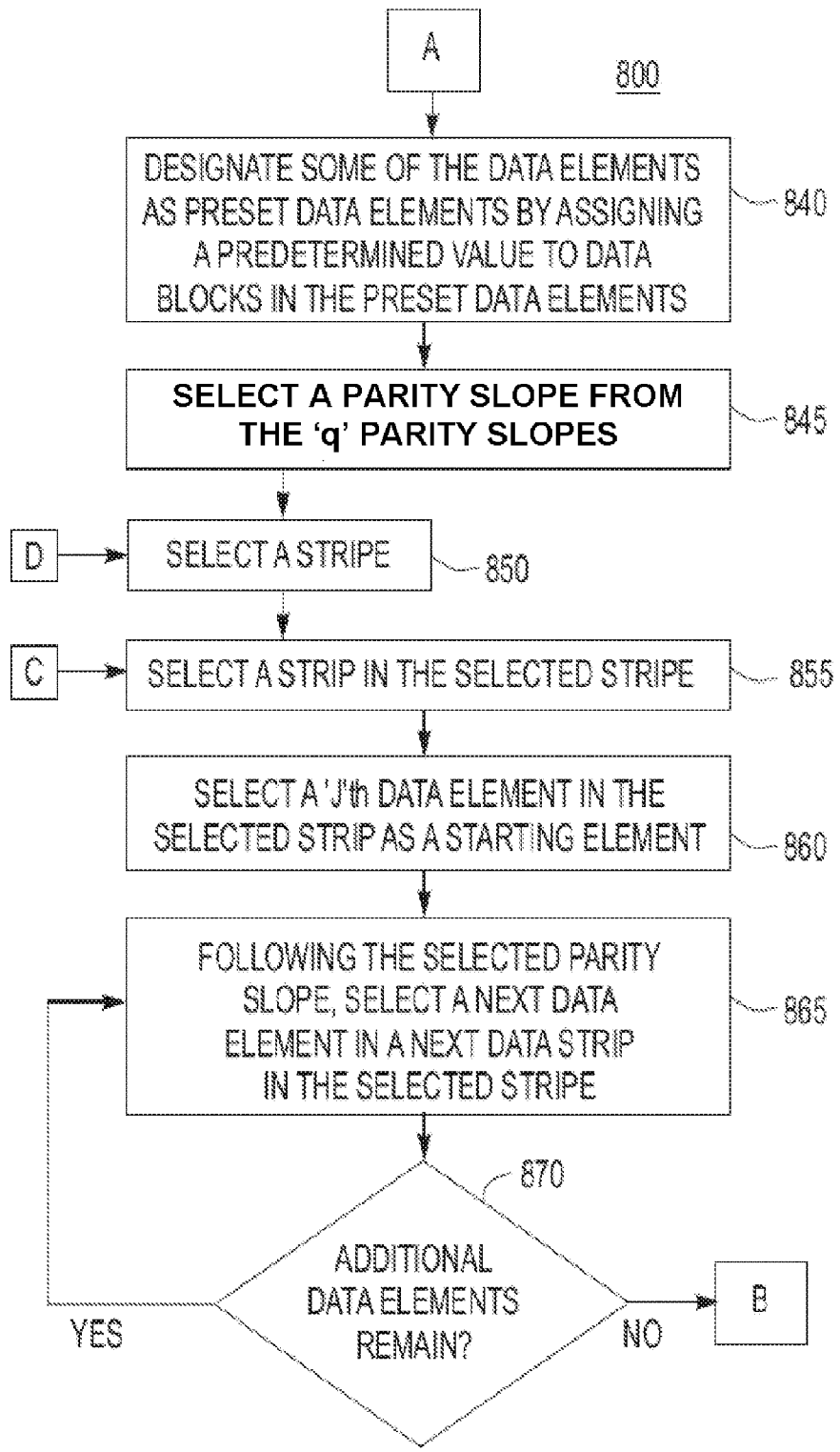
Figure 8C:
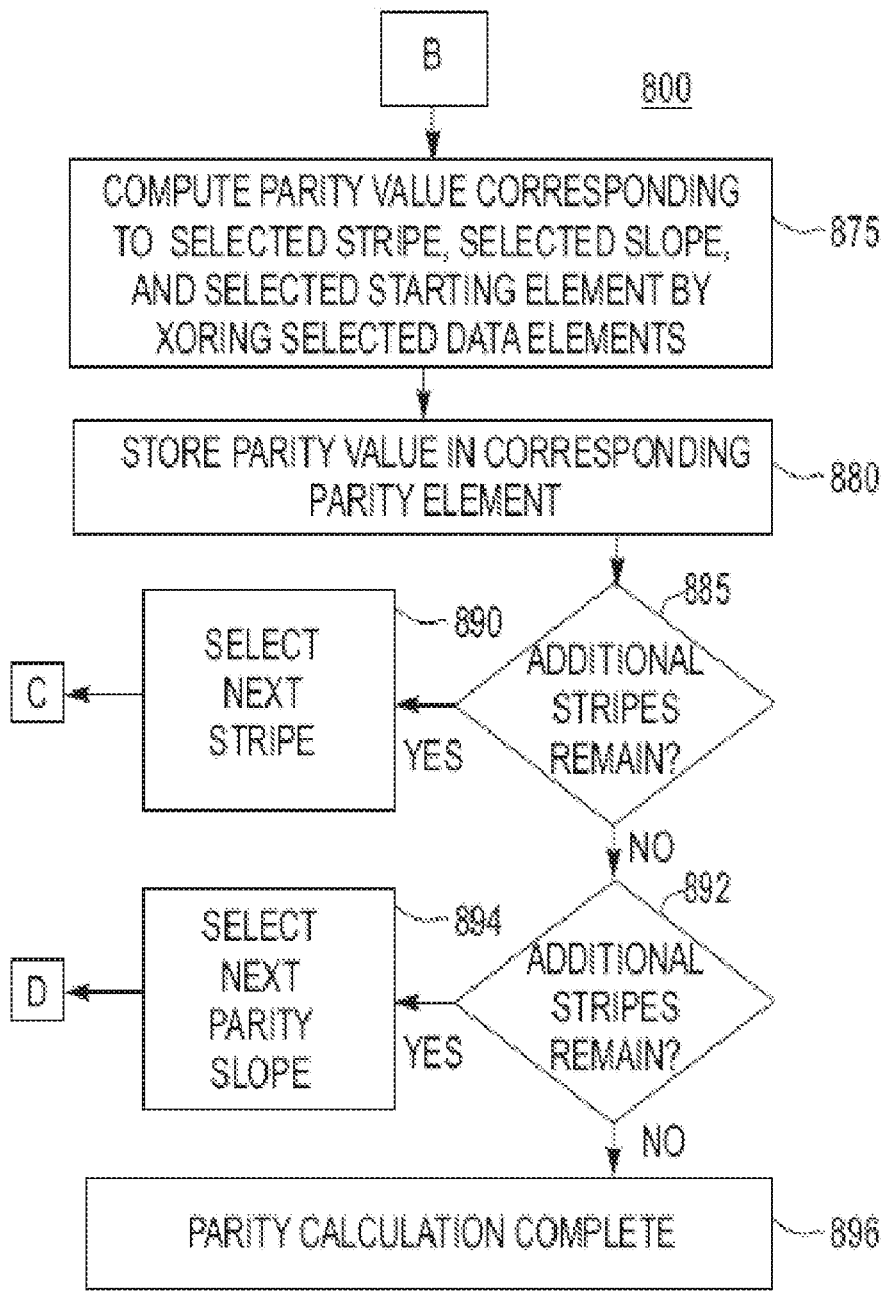

FIG. 8 (FIGS. 8A, 8B, and 8C) illustrates a method 800 of system 10. System 10 provides a storage array comprising n data storage devices and q parity storage devices at step 805. For exemplary purposes, the storage devices in the storage array are designated as data storage devices or parity storage devices. However, the storage devices in the storage array may comprise data elements, parity elements, or data elements and parity elements.

System 10 partitions each of the storage devices into strips such that each strip comprises a predetermined number of blocks at step 810. System 10 organizes the strips into stripes at step 815. System 10 partitions each strip into elements at step 820. All elements comprise a predetermined number of blocks. At step 825, system 10 labels at least some of the elements on the data storage devices as data elements. At step 830, system 10 labels at least some of the elements on the parity devices at parity elements.

System 10 defines a set of q parity slopes at step 835 such that one parity slope is defined for each of the q parity storage devices. System 10 designates some of the data elements as preset data elements at step 840 (FIG. 8B) by assigning a predetermined value to at least some of the data elements in the preset data elements. At step 845, system 10 selects a parity slope from the q parity slopes. System 10 selects a stripe at step 850 and selects a strip in the selected stripe at step 855. At step 860, system 10 selects a jth data element in the selected strip as a starting element. Following the selected parity slope at step 865, system 10 selects a next data element in a next data strip in the selected stripe.

At decision step 870, system 10 determines whether additional data elements remain in the stripe when following the selected parity slope. If yes, system 10 returns to step 865, repeating until all possible data elements are selected that follow a selected parity slope through a selected stripe from a selected starting element. Depending on the value of the parity slope, selection of the data elements may wrap around from a top of one strip to the bottom of the next strip within the stripe, until all of the strips in the stripe have been touched by the sloped line.

When the result of decision step 870 is yes, all possible data elements are selected and system 10 proceeds to step 875 (FIG. 8C). System 10 computes a parity value corresponding to the selected stripe, the selected slope, and the selected starting element by XORing the selected data elements at step 875. System 10 stores the computed parity value in the corresponding parity element at step 880. At decision step 885, system 10 determines if additional stripes remain for processing. If yes, system 10 selects a next stripe at step 890 and returns processing to step 855. Otherwise, system 10 determines whether additional parity slopes remain for processing at decision step 892. If so, system 10 selects a next parity slope at step 894 and returns processing to step 850. Otherwise, the parity calculation is complete at step 896.

It is to be understood that the specific embodiments of the invention that have been described are merely illustrative of certain applications of the principle of the present invention. Numerous modifications may be made to the system and method for enabling efficient recovery from failures in a storage array described herein without departing from the spirit and scope of the present invention. Moreover, while the present invention is described for illustration purpose only in relation to a RAID system, it should be clear that the invention is applicable as well, for example, to any system that enables efficient recovery of data in a storage array utilizing special patterns of presets and sloped parity lines or to any system where the disk drives are replaced by some other storage device or medium.

What is claimed is:

1. A method of reliably storing data on a plurality of storage devices, comprising:
    forming a stripe by:
        logically partitioning a portion of each of the storage devices into one strip;
        organizing strips on the storage devices into a stripe;
        designating a plurality of strips as data strips and a remainder of the strips in the stripe as parity strips;
        partitioning each data strip into a plurality of data elements;
        partitioning each parity strip into a plurality of parity elements;
        ordering the data strips containing data from a first data strip to a last data strip;
        defining a set of parity slopes as a plurality of parity slope values, wherein each parity slope labels one parity strip;
        designating at least some of the data elements as a plurality of preset data elements by assigning a predetermined value to each of the preset data elements;
        identifying at least two data strips that contain a different number of presets;
        associating with each parity element, a set of data elements defined by selecting a data element from the first data strip, following a sloped line having a parity slope corresponding to a parity strip of the parity element through the data elements from one data strip to a next data strip, with wrap-around from a top of one data strip to a bottom of the next data strip, until all the data strips have been touched by the sloped line; and
        for each parity element, computing a parity value from data values stored in the data elements associated to the parity element and storing that parity value in the parity element.

2. The method of claim 1, wherein for each parity element on a parity strip, selecting a data element from the first data strip comprises selecting the data element in a row of the first data strip corresponding to a row of the data element in the parity strip.

3. The method of claim 1, wherein computing the parity value comprises computing an exclusive-OR of the data values stored in the data elements associated with the parity element.

4. The method of claim 1, wherein each strip contains a fixed number of blocks; and wherein the fixed number of blocks is the same for each strip.

5. The method of claim 1, wherein partitioning each strip comprises partitioning each strip into a plurality r of elements, wherein r is a positive integer; wherein the strips comprise n data strips and p parity strips, wherein n and p are positive integers and wherein r is at least equal to $[(p-i)*n]$.

6. The method of claim 1, wherein the parity slope values of the parity slopes comprise integers.

7. The method of claim 1, wherein some of the preset data elements comprise logical elements that do not require a physical location on a storage device.

8. The method of claim 1, wherein the presets generally form a triangle.

9. The method of claim 1, wherein the presets generally form two triangles.

10. The method of claim 7, further comprising a plurality of stripes; and wherein at least some logical presets of each stripe are physically assigned to any one or more of presets, data elements, and parity elements from a stripe.

11. The method of claim 10, wherein each stripe is rotated by at least one storage device with respect to a preceding stripe; and wherein all the presets are logical and are assigned to any of data elements or parity elements by shifting up each strip of each stripe so that any of a data element or a parity element overlays a logical preset of a stripe.

12. The method of claim 10, comprising forming a first stripe and a second stripe;
    wherein the second stripe forms a reflection of the first stripe; and wherein all the logical presets of the first stripe are assigned to any of data elements or parity elements of the second stripe by overlaying any of the data elements or parity elements of the first stripe onto the logical presets of the second stripe.

13. The method of claim 10, comprising forming a first stripe and a second stripe;
    wherein the first stripe is formed so that the presets form a concave wedge; wherein the second stripe is formed so that the presets form a convex wedge; and
    wherein some of the logical presets of each of the first and second stripes are assigned to any of presets, data elements, or parity elements of the other stripe by overlaying a convex wedge of the second stripe into the concave wedge of the first stripe.

14. A computer program product having a plurality of executable instruction codes for reliably storing data on a plurality of storage devices, comprising:
    instruction codes for forming a stripe including:
        a first set of instruction codes for logically partitioning a portion of each of the storage devices into one strip;
        a second set of instruction codes for organizing strips on the storage devices into a stripe;
        a third set of instruction codes for designating a plurality of strips as data strips and the-a remainder of the strips in the stripe as parity strips;
        a fourth set of instruction codes for partitioning each data strip into a plurality of data elements;
        a fifth set of instruction codes for partitioning each parity strip into a plurality of parity elements;
        a sixth set of instruction codes for ordering the data strips containing data from a first data strip to a last data strip;

a seventh set of instruction codes for defining a set of parity slopes as a plurality of parity slope values, wherein each parity slope labels one parity strip;

an eight set of instruction codes for designating at least some of the data elements as a plurality of preset data elements by assigning a predetermined value to each of the preset data elements;

a ninth set of instruction codes for identifying at least two data strips that contain a different number of presets;

a tenth set of instruction codes for associating with each parity element, a set of data elements defined by selecting a data element from the first data strip, following a sloped line having a parity slope corresponding to a parity strip of the parity element through the data elements from one data strip to a next data strip, with wrap-around from a top of one data strip to a bottom of the next data strip, until all the data strips have been touched by the sloped line; and for each parity element, an eleventh set of instruction codes for computing a parity value from data values stored in the data elements associated to the parity element and storing that parity value in the parity element.

15. The computer program product of claim 14, wherein for each parity element on a parity strip, the tenth set of instruction codes selects a data element from the first data strip by selecting the data element in a row of the first data strip corresponding to a row of the data element in the parity strip.

16. The computer program product of claim 14, wherein the eleventh set of instruction codes computes the parity value by computing an of the data values stored in the data elements associated with the parity element.

17. The computer program product of claim 14, wherein each strip contains a fixed number of blocks; and wherein the fixed number of blocks is the same for each strip.

18. The computer program product of claim 14, wherein some of the preset data elements comprise logical elements that do not require a physical location on a storage device.

19. The computer program product of claim 18, further comprising a plurality of stripes; and wherein at least some logical presets of each stripe are physically assigned to any one or more of presets, data elements, and parity elements from a stripe.

20. A system for efficient recovery from failures in storage array comprising:

a plurality of storage devies in said storage array;

an array controller in communication with said plurality of storage devices; and a processor in communication with said array controller, performing;

forming a stripe comprising:

logically partitioning a portion of each of the storage devices into one strip;

organizing strips on the storage devices into a stripe;

designating a plurality of strips as data strips and the-a remainder of the strips in the stripe as parity strips;

partitioning each data strip into a plurality of data elements;

partitioning each parity strip into a plurality of parity elements;

ordering the data strips containing data from a first data strip to a last data strip;

defining a set of parity slopes as a plurality of parity slope values, wherein each parity slope labels one parity strip;

designating at least some of the data elements as a plurality of preset data elements by assigning a predetermined value to each of the preset data elements;

identifying at least two data strips that contain a different number of presets;

associating with each parity element, a set of data elements defined by selecting a data element from the first data strip, following a sloped line having a parity slope corresponding to a parity strip of the parity element through the data elements from one data strip to a next data strip, with wrap-around from a top of one data strip to a bottom of the next data strip, until all the data strips have been touched by the sloped line; and for each parity element, computing a parity value from data values stored in the data elements associated to the parity element and storing that parity value in the parity element.

* * * * *